United States Patent
Chu et al.

(10) Patent No.: US 11,602,002 B2
(45) Date of Patent: Mar. 7, 2023

(54) METHOD AND APPARATUS FOR MULTI-LINK OPERATIONS

(71) Applicant: NXP USA, Inc., Austin, TX (US)

(72) Inventors: Liwen Chu, San Ramon, CA (US);
Hongyuan Zhang, Fremont, CA (US);
Hui-Ling Lou, Sunnyvale, CA (US);
Young Hoon Kwon, Laguna Niguel, CA (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 17/139,679

(22) Filed: Dec. 31, 2020

(65) Prior Publication Data

US 2021/0212150 A1   Jul. 8, 2021

Related U.S. Application Data

(60) Provisional application No. 62/957,164, filed on Jan. 4, 2020, provisional application No. 62/957,167, filed on Jan. 4, 2020, provisional application No. 62/983,254, filed on Feb. 28, 2020.

(51) Int. Cl.
*H04W 76/25* (2018.01)
*H04W 76/15* (2018.01)
*H04W 8/24* (2009.01)
*H04W 76/11* (2018.01)

(52) U.S. Cl.
CPC .......... *H04W 76/25* (2018.02); *H04W 8/24* (2013.01); *H04W 76/11* (2018.02); *H04W 76/15* (2018.02)

(58) Field of Classification Search
CPC ..... H04W 76/11; H04W 76/15; H04W 76/25; H04W 8/24
USPC ................................................. 370/328–329
See application file for complete search history.

(56) References Cited

U.S. PATENT DOCUMENTS

| | | | |
|---|---|---|---|
| 2019/0215884 A1* | 7/2019 | Patil | H04W 76/15 |
| 2019/0268956 A1* | 8/2019 | Xiao | H04L 45/245 |
| 2019/0335454 A1* | 10/2019 | Huang | H04W 88/085 |
| 2019/0387524 A1* | 12/2019 | Asterjadhi | H04W 72/0406 |
| 2020/0021400 A1* | 1/2020 | Cherian | H04L 1/1854 |
| 2020/0413291 A1 | 12/2020 | Chu et al. | |
| 2021/0329547 A1* | 10/2021 | Kim | H04W 52/0229 |
| 2021/0329698 A1* | 10/2021 | Jang | H04W 72/0446 |

* cited by examiner

*Primary Examiner* — Congvan Tran

(57) ABSTRACT

Embodiments of a method and an apparatus for multi-link operations are disclosed. The method involves at a multi-link device (MLD) that supports a first link, link1, and a second link, link2, announcing at least one of a capability, Basic Service Set (BSS) operating parameter, and operating mode of an AP affiliated with an AP MLD in a reported link, and at least one of a capability, Basic Service Set (BSS) operating parameter, and operating mode of an AP affiliated with an AP MLD in a reporting link via a management frame on the reporting link.

17 Claims, 14 Drawing Sheets

---

"ANNOUNCE, AT A MULTI-LINK DEVICE (MLD), THAT SUPPORTS A FIRST LINK, LINK1, AND A SECOND LINK, LINK2, AT LEAST ONE OF A CAPABILITY, BASIC SERVICE SET (BSS) OPERATING PARAMETER, AND OPERATING MODE OF AN AP AFFILIATED WITH AN AP MLD IN A REPORTED LINK, AND AT LEAST ONE OF A CAPABILITY, BASIC SERVICE SET (BSS) OPERATING PARAMETER, AND OPERATING MODE OF AN AP AFFILIATED WITH AN AP MLD IN A REPORTING LINK VIA A MANAGEMENT FRAME ON THE REPORTING LINK"

802

802 — ANNOUNCE, AT A MULTI-LINK DEVICE (MLD), THAT SUPPORTS A FIRST LINK, LINK1, AND A SECOND LINK, LINK2, AT LEAST ONE OF A CAPABILITY, BASIC SERVICE SET (BSS) OPERATING PARAMETER, AND OPERATING MODE OF AN AP AFFILIATED WITH AN AP MLD IN A REPORTED LINK, AND AT LEAST ONE OF A CAPABILITY, BASIC SERVICE SET (BSS) OPERATING PARAMETER, AND OPERATING MODE OF AN AP AFFILIATED WITH AN AP MLD IN A REPORTING LINK VIA A MANAGEMENT FRAME ON THE REPORTING LINK"

FIG. 8

METHOD AND APPARATUS FOR MULTI-LINK OPERATIONS

CROSS-REFERENCE TO RELATED APPLICATIONS

This application is entitled to the benefit of U.S. Provisional Patent Application Ser. No. 62/957,164, filed on Jan. 4, 2020, and U.S. Provisional Patent Application Ser. No. 62/957,167, filed on Jan. 4, 2020, and U.S. Provisional Patent Application Ser. No. 62/983,254, filed on Feb. 28, 2020, each of which is incorporated by reference herein.

BACKGROUND

In multi-link communications, multi-link devices, e.g., access point (AP) multi-link devices (MLDs) or non-AP MLDs, e.g., STA multi-link devices (STA MLDs), can execute various multi-link operations, such as announcements of some features or operations for communication links between the multi-link devices via one or more communication links. As an example, a wireless AP multi-link device in a multi-link Basic Service Set (BSS) may wirelessly transmit a management frame (e.g., a beacon) on each link to transmit information of multiple links and update multi-link device parameters. However, when there are multiple links involved in the multi-link operations, there is a need to efficiently execute the multi-link operations.

SUMMARY

Embodiments of a method and an apparatus for multi-link operations are disclosed. The method involves at a multi-link device (MLD) that supports a first link, link1, and a second link, link2, announcing at least one of a capability, Basic Service Set (BSS) operating parameter, and operating mode of an AP affiliated with an AP MLD in a reported link, and at least one of a capability, Basic Service Set (BSS) operating parameter, and operating mode of an AP affiliated with an AP MLD in a reporting link via a management frame on the reporting link.

In an embodiment, at least one of link1 and link2 is the reporting link.

In an embodiment, the method further involves an inheritance mechanism that includes an element with an element ID value and an optional element ID extension value of the AP in the reported link affiliated with an AP MLD that is not present in a Per STA Profile for the AP in the reported link that is inherited from an element with the same element ID value and an optional same element ID extension value of the AP in the reporting link affiliated with the same AP MLD.

In an embodiment, the method further involves an inheritance mechanism, wherein the element with the element ID value and the optional element ID extension value of the AP in the reported link affiliated with the AP MLD in the reported link that is not present in the Per STA Profile for the AP in the reported link that is inherited from the element with the same element ID value and the optional same element ID extension value of the AP affiliated with another AP MLD in the reporting link that transmits the beacon if the AP affiliated with the same AP MLD in the reporting link does not have transmitted BSSID.

In an embodiment, the Per STA Profile for the AP affiliated with the AP MLD in the reported link is in the non-transmitted BSSID Profile of the AP affiliated with the same AP MLD in the reporting link that does not have transmitted BSSID.

In an embodiment, the method further involves an indication in the management frame about whether the AP on the reported link affiliated with the AP MLD uses the inheritance mechanism to inherit information from the AP affiliated with the same AP MLD, or the AP that transmits the management frame.

In an embodiment, simplified information of the AP in the reported link affiliated with the AP MLD is carried via a Reduced Neighbor Report (RNR) in the management frame sent on the reporting link that is different from the reported link.

In an embodiment, the AP MLD and other AP MLDs belong to a same AP device.

In an embodiment, the APs of one link affiliated with AP MLDs are defined by a multiple BSSID feature and the APs of another link affiliated with the same group of AP MLDs are not defined by the multiple BSSID feature.

In an embodiment, the APs of one link affiliated with AP MLDs are defined by the multiple BSSID feature and the APs of another link affiliated with the same group of AP MLDs are defined by the multiple BSSID feature, and wherein, the AP of one AP MLD in one link has transmitted BSSID, and the AP of the same AP MLD in another link does not have transmitted BSSID.

An embodiment of a MLD is also disclosed. The MLD includes a processor configured to announce at least one of a capability, Basic Service Set (BSS) operating parameter, and operating mode of an AP affiliated with an AP MLD in a reported link, and at least one of a capability, Basic Service Set (BSS) operating parameter, and operating mode of an AP affiliated with an AP MLD in a reporting link via a management frame on the reporting link.

In an embodiment, at least one of a link1 and a link2 is the reporting link.

In an embodiment, the MLD further includes an inheritance mechanism that includes an element with an element ID value and an optional element ID extension value of the AP in the reported link affiliated with an AP MLD that is not present in a Per STA Profile for the AP in the reported link that is inherited from an element with the same element ID value and an optional same element ID extension value of the AP in the reporting link affiliated with the same AP MLD.

In an embodiment, the MLD further includes an inheritance mechanism, wherein the element with the element ID value and the optional element ID extension value of the AP in the reported link affiliated with the AP MLD in the reported link that is not present in the Per STA Profile for the AP in the reported link that is inherited from the element with the same element ID value and the optional same element ID extension value of the AP affiliated with another AP MLD in the reporting link that transmits the beacon if the AP affiliated with the same AP MLD in the reporting link does not have transmitted BSSID.

In an embodiment, the Per STA Profile for the AP affiliated with the AP MLD in the reported link is in the non-transmitted BSSID Profile of the AP affiliated with the same AP MLD in the reporting link that does not have transmitted BSSID.

In an embodiment, the MLD further includes an indication in the management frame about whether the AP on the reported link affiliated with the AP MLD uses the inheritance mechanism to inherit information from the AP affiliated with the same AP MLD, or the AP that transmits the management frame.

In an embodiment, simplified information of the AP in the reported link affiliated with the AP MLD is carried via a Reduced Neighbor Report (RNR) in the management frame sent on the reporting link that is different from the reported link.

In an embodiment, the AP MLD and other AP MLDs belong to a same AP device.

In an embodiment, the APs of one link affiliated with AP MLDs are defined by a multiple BSSID feature and the APs of another link affiliated with the same group of AP MLDs are not defined by the multiple BSSID feature.

In an embodiment, the APs of one link affiliated with AP MLDs are defined by the multiple BSSID feature and the APs of another link affiliated with the same group of AP MLDs are defined by the multiple BSSID feature, and wherein, the AP of one AP MLD in one link has transmitted BSSID, and the AP of the same AP MLD in another link does not have transmitted BSSID.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 8 illustrates a flow diagram of a technique for announcing information in accordance with an embodiment of the invention.

Throughout the description, similar reference numbers may be used to identify similar elements.

DETAILED DESCRIPTION

Figure 1:
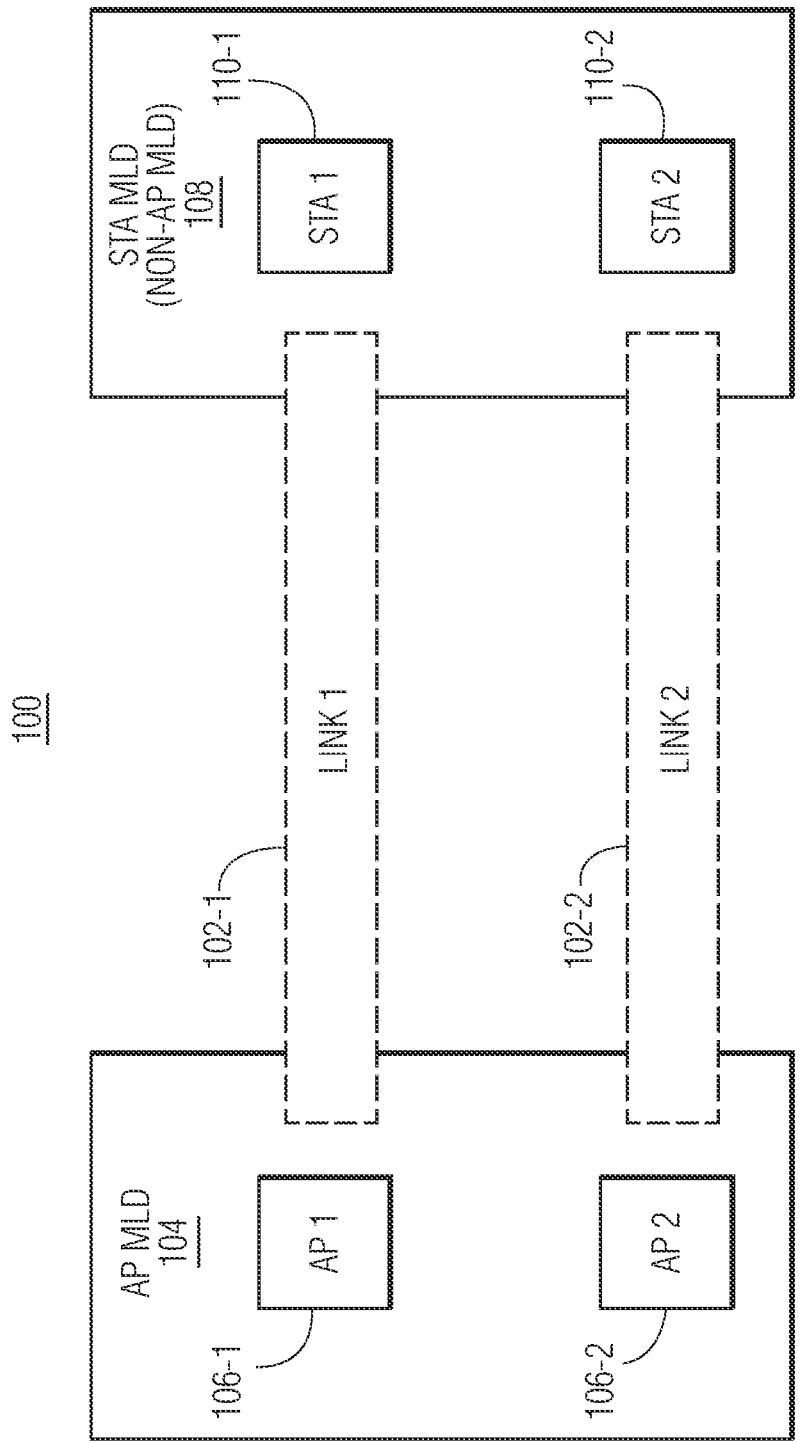
FIG. 1 depicts a multi-link communications system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

To effectively announce network information and the presence of a wireless local area network (WLAN), a High Efficiency (HE) device can have two radios. For example, the two radios may include an access point (AP) multi-link device and a station (STA) multi-link device that are tightly integrated. The two radios may transmit frames on one link or on multiple links and may also have the same Media Access Control (MAC) addresses or different MAC addresses. In some embodiments, a frame is a beacon in which information about a multi-link device (MLD) is transmitted periodically by an AP multi-link device (AP MLD) to a non-AP STA multi-link device (STA MLD) in a multi-link infrastructure Basic Service Set (BSS). In one embodiment, the link used by the AP MLD for beacon transmission (e.g., link1) is the master link of the AP MLD. A MLD may transmit beacons on multiple links to communicate information about the MLD and the MLD's radios to update various parameters and operations, information that could otherwise be consolidated to beacons transmitted on a select set of links.

FIG. 1 depicts a multi-link communications system that is used for wireless (e.g., WiFi) communications. In the embodiment depicted in FIG. 1, a multi-link communications system 100 includes one AP multi-link device, which is implemented as AP MLD 104, and one non-AP STA multi-link device (or multiple non-AP STA MLDs), which is implemented as STA MLD 108. The multi-link communications system can be used in various applications, such as industrial applications, medical applications, computer applications, and/or consumer or enterprise applications. In some embodiments, the multi-link communications system is a wireless communications system, such as a wireless communications system compatible with an Institute of Electrical and Electronics Engineers (IEEE) 802.11 protocol. For example, the multi-link communications system may be a wireless communications system compatible with the IEEE 802.11be protocol. Although the depicted multi-link communications system 100 is shown in FIG. 1 with certain components and described with certain functionality herein, other embodiments of the multi-link communications system may include fewer or more components to implement the same, less, or more functionality. For example, in some embodiments, the multi-link communications system includes one AP MLDs with multiple STA MLDs, or multiple AP MLDs with more than one STA MLD. In another example, although the multi-link communications system is shown in FIG. 1 as being connected in a certain topology, the network topology of the multi-link communications system is not limited to the topology shown in FIG. 1.

In the embodiment depicted in FIG. 1, the AP MLD 104 includes two radios, implemented as access points (APs) 106-1 and 106-2. The APs 106-1 and 106-2 may be implemented in hardware (e.g., circuits), software, firmware, or a combination thereof. The APs 106-1 and 106-2 may be fully or partially implemented as an integrated circuit (IC) device. In some embodiments, the APs 106-1 and 106-2 are wireless APs compatible with at least one WLAN communications protocol (e.g., at least one IEEE 802.11 protocol). For example, the APs 106-1 and 106-2 may be wireless APs compatible with the IEEE 802.11be protocol. In some embodiments, an AP MLD connects to a local area network (e.g., a LAN) and/or to a backbone network (e.g., the Internet) through a wired connection and that wirelessly connects to STA MLDs and legacy wireless stations (STAs), for example, through one or more WLAN communications protocols, such as the IEEE 802.11 protocol. In some embodiments, an AP of an AP MLD includes at least one antenna, at least one transceiver operably connected to the at least one antenna, and at least one controller operably connected to the corresponding transceiver. In some embodiments, the at least one transceiver includes a physical layer (PHY) device. The at least one controller operably may be configured to control the at least one transceiver to process received packets through the at least one antenna. In some embodiments, the at least one controller is implemented within a processor, such as a microcontroller, a host processor, a host, a digital signal processor (DSP), or a central processing unit (CPU), which can be integrated in a corresponding transceiver. Each of the APs 106-1 or 106-2 of the AP MLD 104 may operate in a different frequency band. For example, the AP 106-1 may operate in a 2.4 gigahertz (GHz) frequency band and the AP 106-2 may operate in a 5 GHz frequency band. Although the AP MLD 104 is shown in FIG. 1 as including two APs, other embodiments of the AP MLD 104 may include more than two APs.

In the embodiment depicted in FIG. 1, the non-AP STA multi-link device, implemented as STA MLD 108, includes two radios which are implemented as non-AP stations (STAs) 110-1 and 110-2. The STAs 110-1 and 110-2 may be implemented in hardware (e.g., circuits), software, firmware, or a combination thereof. The STAs 110-1 and 110-2 may be fully or partially implemented as an IC device. In some embodiments, the non-AP STAs 110-1 and 110-2 are wireless devices that wirelessly connect to wireless APs. For example, at least one of the non-AP STAs 110-1 or 110-2 may be implemented in a laptop, a desktop personal computer (PC), a mobile phone, or other wireless device that supports at least one WLAN communications protocol. In some embodiments, the non-AP STAs 110-1 and 110-2 are wireless devices compatible with at least one IEEE 802.11 protocol (e.g., the IEEE 802.11be protocol). In some embodiments, the STA MLD has one Media Access Control (MAC) data service interface. In some embodiments, the AP MLD 104 and/or the STA MLD 108 identify which communication links support the multi-link operation during a multi-link operation setup phase and/or exchanges information regarding multi-link capabilities during the multi-link operation setup phase. In some embodiments, the STA MLD 108 uses any communication link to support the multi-link operation during a multi-link operation setup phase and/or exchanges information regarding multi-link capabilities during the multi-link operation setup phase. Each of the non-AP STAs 110-1 and 110-2 of the STA MLD 108 may operate in a different frequency band. For example, the non-AP STA 110-1 may operate in the 2.4 GHz frequency band and the non-AP STA 110-2 may operate in the 5 GHz frequency band. In some embodiments, each STA includes at least one antenna, at least one transceiver operably connected to the at least one antenna, and at least one controller connected to the corresponding transceiver. In some embodiments, the at least one transceiver includes a PHY device. The at least one controller may be configured to control the at least one transceiver to process received packets through the at least one antenna. In some embodiments, the at least one controller is implemented within a processor, such as a microcontroller, a host processor, a host, a DSP, or a CPU, which can be integrated in a corresponding transceiver.

In the embodiment depicted in FIG. 1, the STA MLD 108 communicates with the AP MLD 104 via two communication links 102-1 and 102-2. For example, each of the non-AP STAs 110-1 or 110-2 communicates with an AP 106-1 or 106-2 via corresponding communication links 102-1 or 102-2. Although the STA MLD 108 is shown in FIG. 1 as including two non-AP STAs, other embodiments of the STA MLD 108 may include more than two non-AP STAs. In addition, although the AP MLD 104 communicates (e.g., wirelessly communicates) with the STA MLD 108 via multiple links 102-1 and 102-2 in other embodiments, the AP MLD 104 may communicate (e.g., wirelessly communicates) with the STA MLD 108 via more than two communication links. The two communication links 102-1 and 102-2 may also utilize synchronized (simultaneous) transmission or unsynchronized transmission.

In some embodiments, an AP MLD or a STA MLD may transmit beacons on more than one link that the AP MLD or STA MLD operates on even though the AP MLD or STA MLD has different MAC addresses. In such an example, single band STAs can associate with the AP MLD in any band that the beacons are transmitted on and the STA MLD that associates with the AP MLD can be treated as being in the same BSS. In one embodiment, all of the links used for beacon transmission and the STA MLD that associates with the AP MLD through a link (e.g., link1), treat link1 as a master link or MAC (link) for association. The MAC (link) of the STA MLD used for association is also the master MAC (link). In another embodiment, any link (e.g., link1) is the link used for the association.

Figure 2:
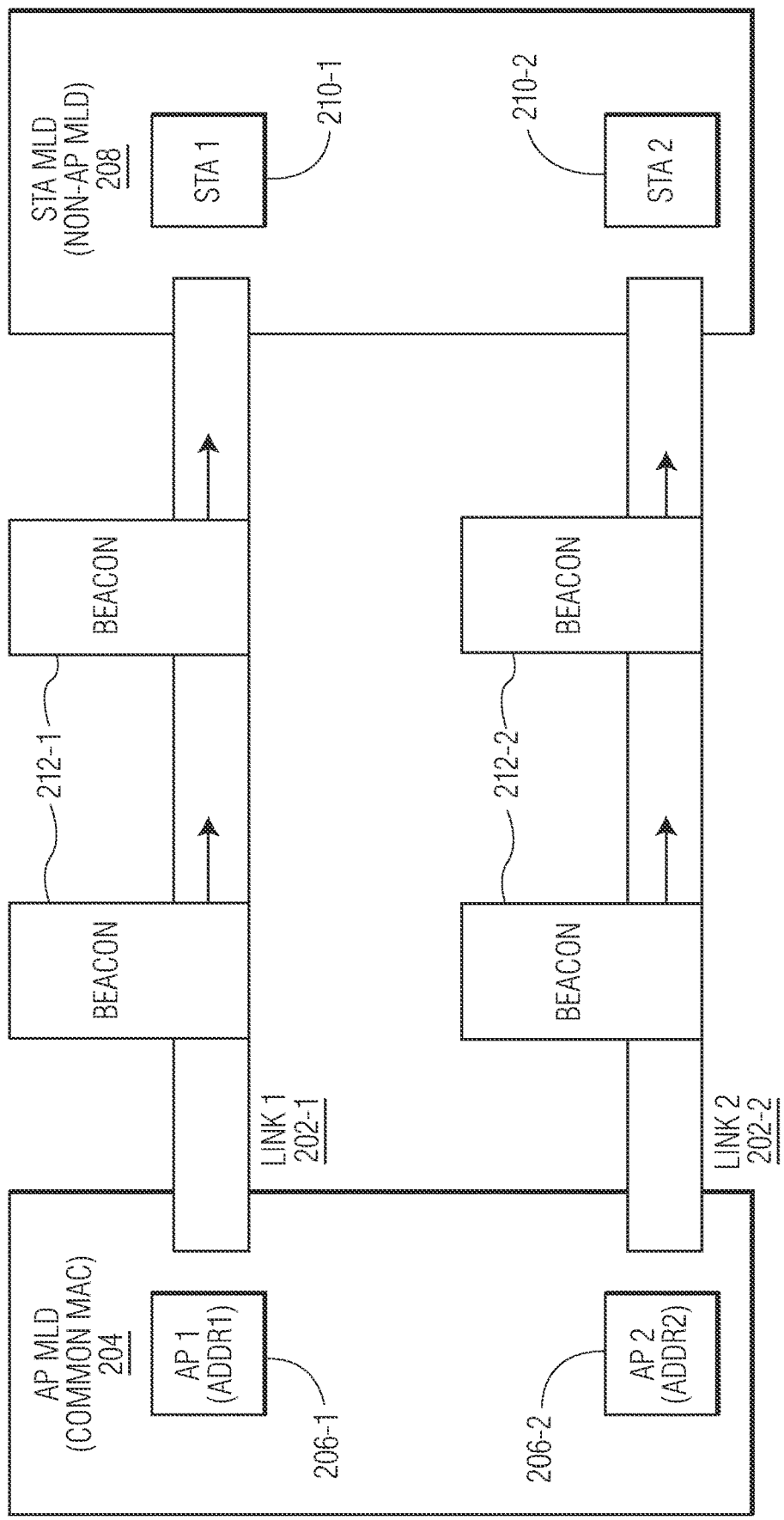
FIG. 2 illustrates an example of a technique for operating links in the multi-link communications system depicted in FIG. 1.

FIG. 2 illustrates an example of a technique for operating links in the multi-link communications system depicted in FIG. 1. In the technique illustrated in FIG. 2, an AP MLD transmits beacons on more than one link even though the AP MLD's access points (APs) have different MAC addresses. In an embodiment, the AP MLD 204 shown in FIG. 2 possesses a common MAC and includes two APs, implemented as AP1 206-1 and AP2 206-2. While AP1 206-1 has a MAC Address 1 (identified as Addr1, i.e., BSSID of AP1), AP2 206-2 has a MAC Address 2 (identified as Addr2, i.e., BSSID of AP2). In the example of FIG. 2, the AP MLD 204 uses two communication links, implemented as link1 202-1 and link2 202-2 to transmit beacons 212-1 and beacons 212-2 to an associated non-AP STA MLD 208. The STA MLD 208 includes two non-AP STAs, implemented as STA1 210-1 and STA2 210-2. In such an embodiment, AP1 206-1 with MAC Addr1 transmits beacons 212-1 on link1 202-1 to STA1 210-1 of the STA MLD 208. In addition, AP2 206-2 with MAC Addr2 transmits beacons 212-2 on link2 202-2 to STA2 210-2 of the STA MLD 208. In some embodiments, the beacon is a management frame that carries MLD information. In one embodiment, AP1 206-1 and AP2 206-2 are radios that transmit beacons 212-1 on link1 202-1 and beacons 212-2 on link2 202-2. In addition, at least one of a same sequence number set, security (Pairwise Transit Key (PTK) for individually-addressed frames), and power state may apply to the radio AP1 206-1 and the radio AP2 206-2. Although the example illustrated in FIG. 2 is shown as including two beacons 212-1 and 212-2 transmitted on link1 202-1 and 202-2, other embodiments may include more than two beacons, or less than two beacons being transmitted.

When multiple AP MLDs exist in one AP device, APs of the multiple AP MLDs that are in one link may be Multi-BSSID APs, whereas APs of the multiple AP MLDs that are in another link may be Co-located APs. Among the multiple AP MLDs in one AP device, one AP of an AP MLD may be in one link only. The Multi-BSSID APs or Co-located APs in different bands may be used for an association with STA MLDs with different numbers of links. In one embodiment, each AP MLD in an AP device transmits beacons through all of the AP MLDs' links and allows STA MLDs to associate with the AP MLDs through all of the AP MLDs' links. In one embodiment, the AP MLDs in an AP device may have different master links or the same master links. In one embodiment, a master AP announces a capability and an operation parameter of a slave AP affiliated with the same AP MLD as the master AP. In addition, a STA MLD (or legacy STA) may associate with an AP MLD through the master AP of the AP MLD, in which the link used for association is the master link of the STA MLD.

Multi-BSSID APs and Co-located APs in different bands as well as the capability and operation parameters in the beacons of Multi-BSSID APs and Co-located APs are described in further detail with reference to FIGS. 3A-3D.

Figure 3A:
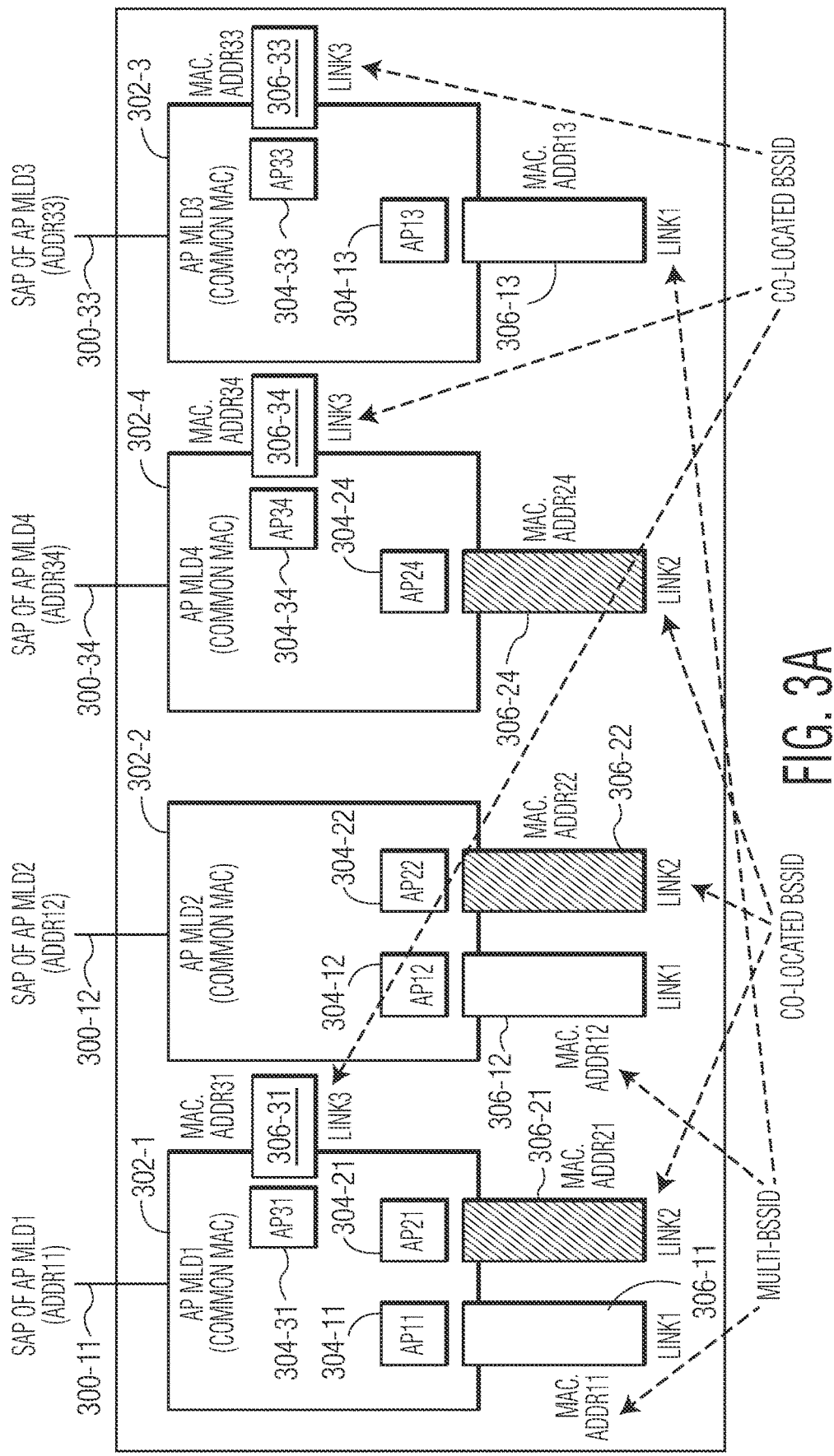
FIG. 3A depicts multi-link communication systems in accordance with an embodiment of the invention.

FIG. 3A depicts multi-link communication systems in accordance with an embodiment of the invention. In example depicted in FIG. 3A, Multi-BSSID APs, Co-located APs, and APs in different bands are being used for an association with STA MLDs (not shown) with different numbers of links. In the example depicted in FIG. 3A, each of the four AP MLDs have a common MAC and each AP MLD is associated with a designated MAC Service Access Point (SAP) address, shown as an SAP of AP MLD. As an example, each AP of an AP MLD may have a BSSID (MAC address of the AP), in which the MAC AP address of an AP MLD can be (i) the BSSID of one AP of the AP MLD or (ii) different from the BSSIDs of all the APs of the AP MLD. The AP MLDs shown in FIG. 3A further include at least one AP that has a designated AP MAC address (i.e., AP's BSSID) with an affiliated link. For example, a first AP MLD, implemented as AP MLD1 (common MAC) 302-1 is shown as being associated with a first SAP of MLD, implemented as SAP of MLD1 (addr11, i.e., BSSID11) 300-11. In such an example, AP MLD1 302-1 includes three APs, implemented as AP11 (MAC Addr11) 304-11 with an affiliated link1 306-11, AP21 (MAC Addr21) 304-21 affiliated with link2 306-21, and AP31 (MAC Addr31) 304-31 affiliated with link3 306-31. Such an example also includes a second AP MLD, implemented as AP MLD2 (common MAC) 302-2 that is shown as being associated with a second SAP of MLD, implemented as SAP of MLD2 (addr12, i.e., BSSID12) 300-12. In such an example, AP MLD2 302-2 includes two APs, implemented as AP12 (MAC Addr12) 304-12 with an affiliated link1 306-12 and AP22 (MAC Addr22) 304-22 affiliated with link2 306-22. Such an example also includes a third AP MLD, implemented as AP MLD3 (common MAC) 302-3 that is shown as being associated with a third SAP of MLD, implemented as SAP of MLD3 (addr33, i.e., BSSID33) 300-33. In such an example, AP MLD3 302-3 includes two APs, implemented as AP13 (MAC Addr13) 304-13 with an affiliated link1 306-13 and AP33 (MAC Addr33) 304-33 affiliated with link3 306-33. Such an example also includes a fourth AP MLD, implemented as AP MLD4 (common MAC) 302-4 that is shown as being associated with a fourth SAP of MLD, implemented as SAP of MLD4 (addr34, i.e., BSSID34) 300-34. In such an example, AP MLD4 302-4 includes two APs, implemented as AP24 (MAC Addr24) 304-24 with an affiliated link2 306-24 and AP34 (MAC Addr34) 304-34 affiliated with link3 306-34. In such an embodiment, AP11 (MAC Addr11) 304-11 in link1 306-11 of AP MLD1 302-1, AP12 (MAC Addr12) 304-12 in link1 306-12 of AP MLD2 302-2, and AP13 (MAC Addr13) 304-13 in link1 306-13 of AP MLD3 302-3 are Multi-BSSID APs in the same channel and may share beacon transmission. In addition, AP34 (MAC Addr34) 304-34 in link3 306-34 of AP MLD4 302-4, AP33 (MAC Addr33) 304-33 in link3 306-33 of AP MLD3 302-3, and AP31 (MAC Addr31) 304-31 in link3 306-31 of AP MLD1 302-1 are Co-located BSSID APs that may not share beacon transmission. Furthermore, AP21 (MAC Addr21) 304-21 in link2 306-21 of AP MLD1 302-1, AP22 (MAC Addr22) 304-22 in link2 306-22 of AP MLD2 302-2, and AP24 (MAC Addr24) in link2 306-24 of AP MLD4 302-4 are Co-located BSSID APs that may not share beacon transmission.

Although the example depicted in FIG. 3A is shown as including four AP MLDs, other embodiments may include more than four AP MLDs or less than four AP MLDs. In addition, although the AP MLDs in FIG. 3A are shown as including at least two APs, other embodiments may include AP MLDs having less than two APs or more than two APs. Furthermore, although FIG. 3A shows four total SAP of BSSIDs, other embodiments may include more than four SAP of BSSIDs or less than four SAP of BSSIDs.

Figure 3B:
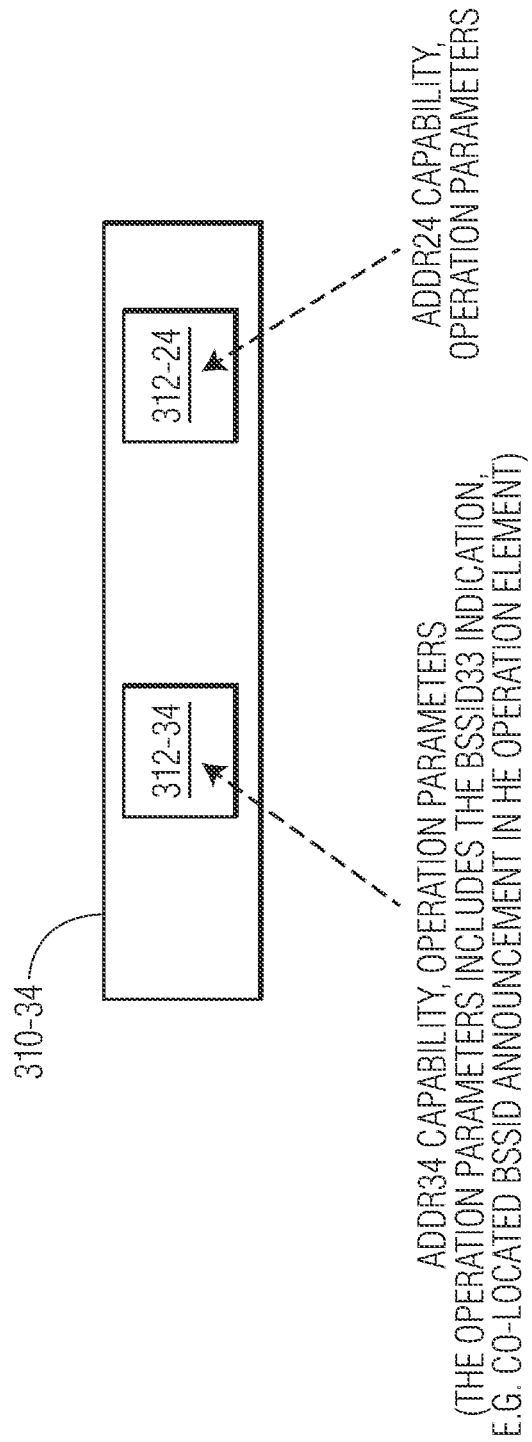
FIG. 3B depicts an example of a frame format used in the multi-link communications system depicted in FIG. 1.

FIG. 3B depicts an example of a frame format used in the multi-link communications system depicted in FIG. 1. In FIG. 3B, elements of a management frame (e.g., beacon) transmitted by an AP of an AP MLD shown in FIG. 3A are depicted. With reference to FIG. 3B, a beacon, implemented as AP34's beacon 310-34 is shown. The beacon as shown in FIG. 3B includes information such as capability, operating parameters, and announcements. AP34's beacon 310-34 is an example of a beacon transmitted by an AP of AP MLD4 302-4 in FIG. 3A. In such an example, AP34's beacon 310-34 includes a first group of information elements 312-34 and a second information element(s) 312-24. While the first group of information elements 312-34 includes Addr34's (AP34's) capability and operation parameters, which includes a BSSID33 indication (e.g., Co-located BSSID announcement in HE Operation element), the second information element(s) 312-24 includes Addr24's (AP24's) capability and operation parameters that are carried in Per Link Profile.

With further reference to FIG. 3B, a beacon similar to AP34's beacon 310-34 may be used by AP24 304-24. AP24's beacon may be transmitted by AP MLD4 302-4 in FIG. 3A. In one embodiment, AP24's beacon includes a first group of information elements and a second information element(s). The first group of information elements of AP24's beacon may include Addr24's (AP24's) capability and operation parameters, which includes a BSSID34 indication (e.g., Co-located BSSID announcement in HE Operation element), while the second information element(s) of AP24's beacon may include Addr34's (AP34's) capability and operation parameters that are carried in Per Link Profile.

Figure 3C:
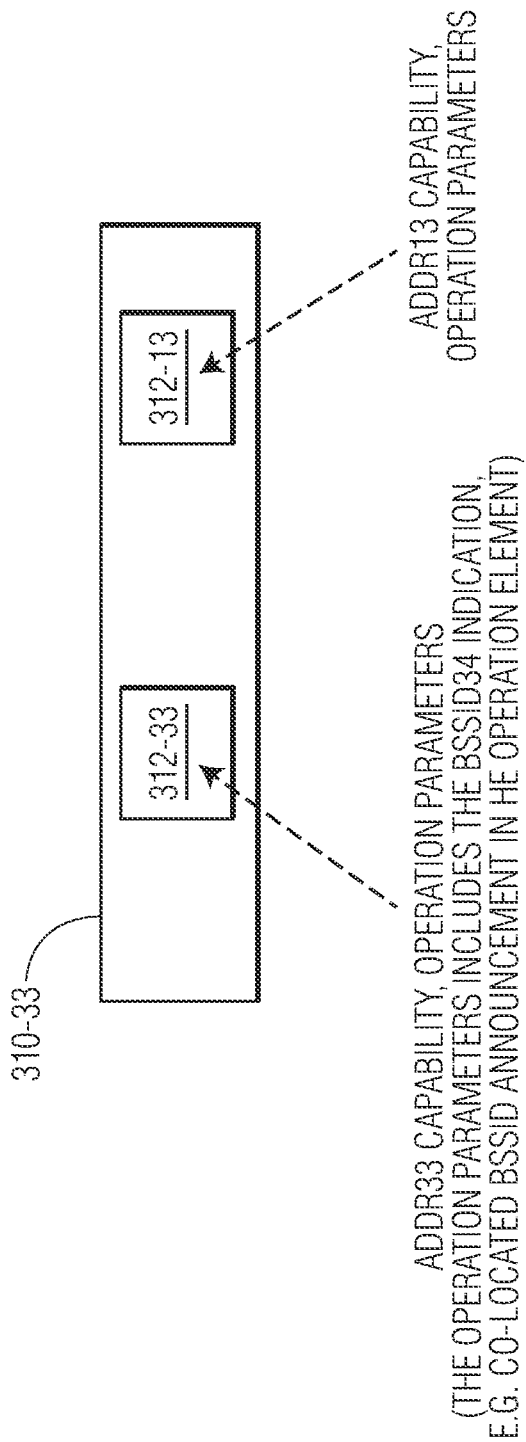
FIG. 3C depicts another example of a frame format used in the multi-link communications system depicted in FIG. 1.

FIG. 3C depicts another example of a frame format used in the multi-link communications system depicted in FIG. 1. In FIG. 3C elements of a management frame (e.g., beacon) transmitted by an AP of an AP MLD shown in FIG. 3A are depicted. With reference to FIG. 3C, a beacon, implemented as AP33's beacon 310-33 is shown. The beacon as shown in FIG. 3C includes information such as capability, operating parameters, and announcements. AP33's beacon 310-33 is an example of a beacon transmitted by an AP of AP MLD3 302-3 in FIG. 3A. In such an example, AP33's beacon 310-33 includes a first group of information elements, 312-33, and a second information element(s), 312-13. While the first group of information elements, 312-33, includes Addr33's (AP33's) capability and operation parameters, which includes a BSSID34 indication (e.g., Co-located BSSID announcement in HE operation element), the second information element(s) 312-13 includes Addr13's (AP13's) capability and operation parameters.

Figure 3D:
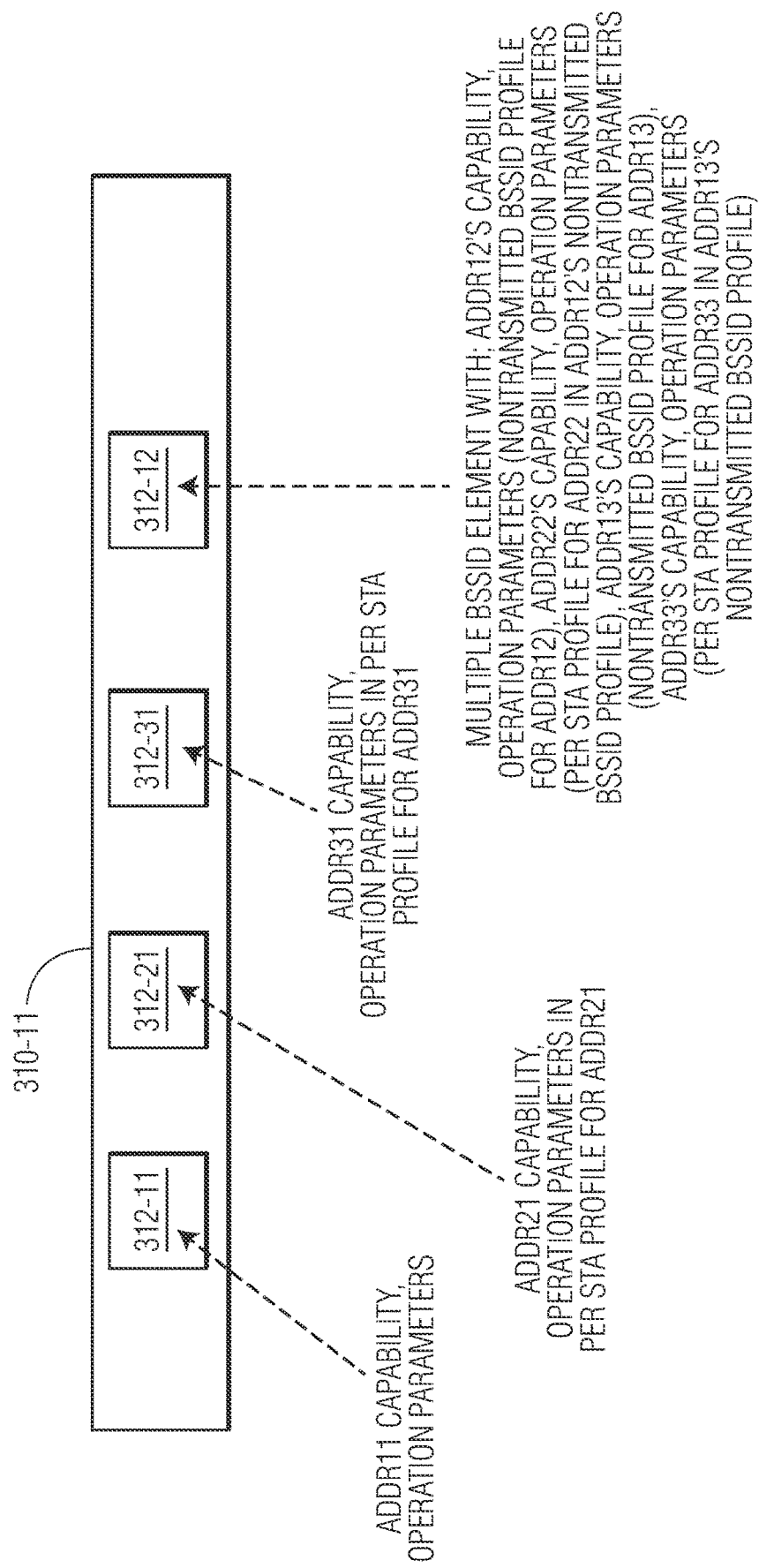
FIG. 3D depicts another example of a frame format used in the multi-link communications system depicted in FIG. 1.

FIG. 3D depicts another example of a frame format used in the multi-link communications system depicted in FIG. 1. The frame format as shown in FIG. 3D may be used in a link where a Multiple BSSID feature is supported, such that an AP with transmitted BSSID may transmit beacons while APs with non-transmitted BSSIDs may not transmit beacons. In FIG. 3D, elements of a management frame (e.g., beacon) transmitted by an AP of an AP MLD with transmitted BSSID shown in FIG. 3A are depicted. With reference to FIG. 3D, a beacon, implemented as AP11's beacon 310-11 is shown. The beacon as shown in FIG. 3D includes information such as capability, operating parameters, and announcements. In such an example, AP11's beacon 310-11 includes a first group of information elements 312-11, a second information element(s) 312-21, a third information element(s) 312-31, and a fourth information element(s) 312-12. In AP11's beacon the first group of information elements 312-11 includes Addr11's capability and operation parameters, the second information element(s) 312-21 includes Addr21's capability and operation parameters in a Per STA Profile for Addr21, the third information element(s) 312-31 includes Addr31's capability and operation parameters in a Per STA Profile for Addr31, and the fourth information element(s) 312-12 is a Multiple-BSSID element with (i) Addr12's capability and operation parameters (non-transmitted BSSID profile for Addr12) as well as Addr22's capability and operation parameters (Per STA Profile for Addr22 is in Addl2's non-transmitted BSSID profile) where the AP with Addr22 and the AP with Addr12 are affiliated with one AP MLD, and (ii), Addr13's capability and operation parameters (non-transmitted BSSID profile for Addr13) as well as Addr33's capability and operation parameters (Per STA Profile for Addr33 is in Addr13's non-transmitted BSSID profile) where the AP with Addr33 and the AP with Addr13 are affiliated with another AP MLD.

In accordance with an embodiment of the invention, a technique to implement multi-link operations involves at a multi-link device (MLD) that supports a first link, link1, and a second link, link2, announcing at least one of a capability, Basic Service Set (BSS) operating parameter, and operating mode of an AP affiliated with an AP MLD in a reported link, and at least one of a capability, Basic Service Set (BSS) operating parameter, and operating mode of an AP affiliated with an AP MLD in a reporting link via a management frame on the reporting link.

A technique for multi-link communication operation that involves a MLD announcing a capability, BSS operating parameter, or operating mode in a beacon on one of the AP MLD's multiple links is described in further detail below with reference to FIG. 4.

Figure 4:
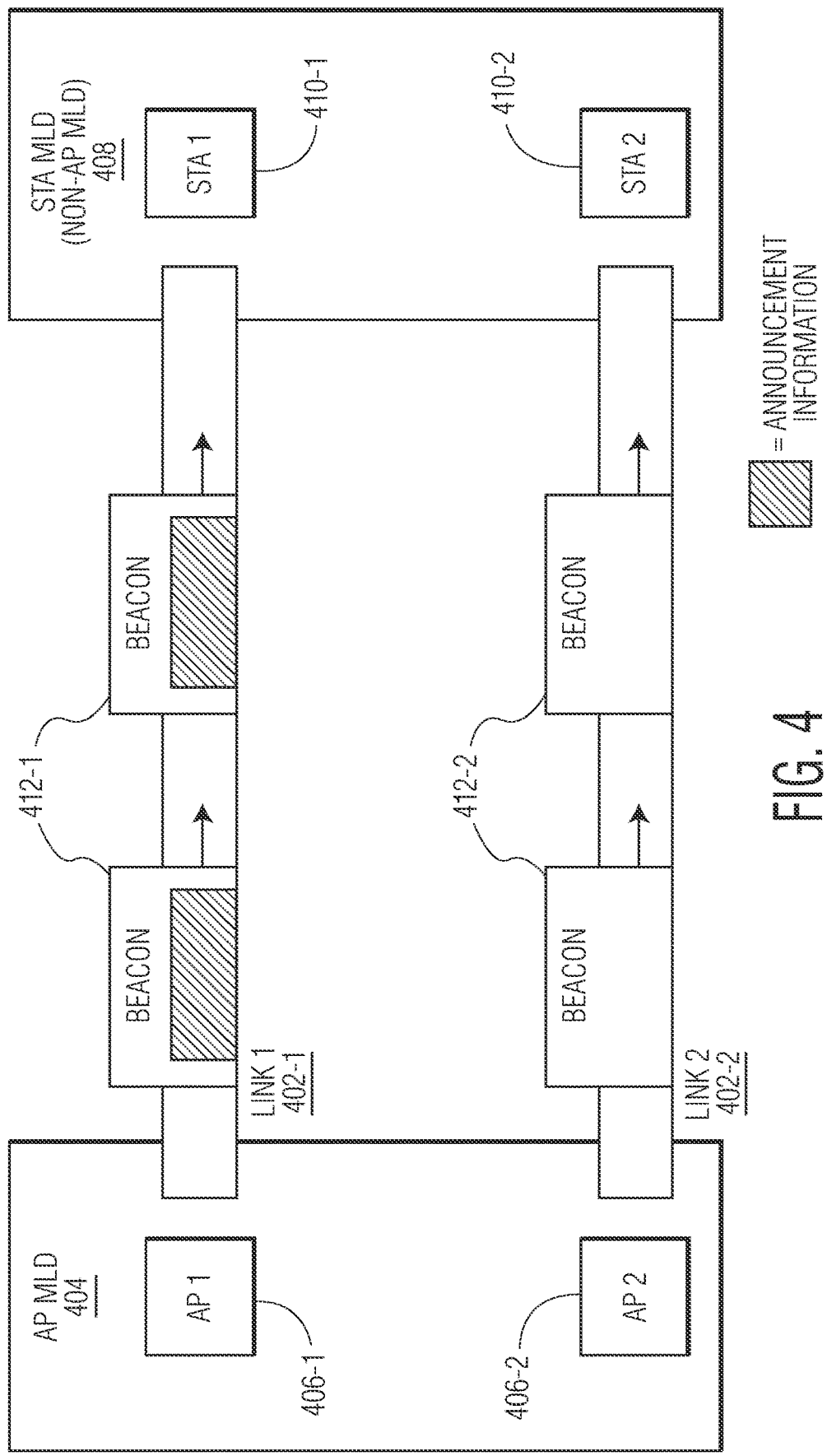
FIG. 4 illustrates another example of a technique for operating links used in the multi-link communications system depicted in FIG. 1.

FIG. 4 illustrates an example of a technique for operating links in the multi-link communications system depicted in FIG. 1 in accordance with an embodiment of the invention. In the embodiment illustrated in FIG. 4, an AP MLD with two APs is shown transmitting beacons on two separate links to a STA MLD and the STA MLD's affiliated STAs. In such a technique, management frames (e.g., beacon, Probe Request/Response, Association Request/Response, etc.) transmitted on one link (e.g., link1) carries announcement information that is at least one of a capability, BSS operating parameter, and operating mode of at least one of link1 and another link (e.g., link2). For example, FIG. 4 illustrates an AP MLD 404 that includes two APs, implemented as AP1 406-1 and AP2 406-2. AP1 406-1 of AP MLD 404 transmits a beacon 412-1 on link1 402-1 to STA1 410-1 of STA MLD 408, such that link1 402-1 may be selected for association and beacon transmission. In addition, AP2 406-2 transmits beacons 412-2 on link2 402-2 to STA2 410-2 of STA MLD 408. In one embodiment, the beacons 412-1 transmitted on link1 402-1 by AP1 406-1 of AP MLD 404 include at least one of the capability, BSS operating parameter, and operating mode of link1 402-1. In another embodiment, the beacons 412-1 transmitted on link1 402-1 by AP1 406-1 of AP MLD 404 include an announcement that is at least one of the capability, BSS operating parameter, and operating mode of link2 402-2. Examples of a capability may include a High-Throughput (HT) capability, a Very High-Throughput (VHT) capability, a High-Efficiency (HE) capability, or an EHT capability. Examples of a BSS operating parameter may include a HT operating parameter, a VHT operating parameter, a HE operating parameter, an EHT operating parameters, EDCA parameters, etc.

With reference to the technique illustrated in FIG. 4, the AP MLD 404 may change the operation mode using at least one of three techniques described herein. In a first operation mode, the AP MLD may change the AP MLD or the STA MLD operation mode of any link (e.g., link1 or link2) through a link, such that in the first operation mode technique an operation mode change includes link ID and new bandwidth (BW), transmission (Tx)/reception (Rx) number of spatial streams (NSS)/number of space time streams (NSTS). In a second operation mode, the AP MLD may change the AP MLD or the STA MLD operation mode of a link (e.g., link1) through frame exchange in link1, such that in the second operation mode, the operation mode change includes new BW, Tx/Rx NSS/NSTS. In a third operation mode, the AP MLD may change the AP MLD or the STA MLD operation mode of a link (e.g., link1) through any link (e.g., link2 or link3), such that in the second operation mode, the operation mode change includes link ID and new BW, Tx/Rx NSS/NSTS. Furthermore, one operation mode change announcement may announce the operation mode changes, BW, NSS/NSTS of either (i) a single link (e.g., link1) only or (ii) multiple links (e.g., link1 and link2). In some embodiments, the AP MLD 404 or the STA MLD 408 may change the AP MLD or the STA MLD operation mode via an Action frame (e.g., Operation Mode Notification) or an HE Control field (e.g., Operation Mode Control).

With further reference to the technique illustrated in FIG. 4, the announcement information of a beacon 412-1 on link1 402-1 may change the on/off state of at least one of link1 402-1 and link2 402-2 via the beacon's transmission on link1. In one embodiment, an AP MLD may turn on/off a link (e.g., link1) through a link (e.g., link1). In another embodiment, the AP MLD may turn on/off link1 through any active link (e.g., link2). In another embodiment, the AP MLD may turn on/off link1 through the link being turned on/off (e.g., link1). In another embodiment, the AP MLD may turn on/off link1 through the reporting link if the reporting link is active at the STA MLD, otherwise, the AP MLD may turn on/off link1 through any active link. In some embodiments, within the beacon of a link turning on/off announcement, a target time of turned on/off may be announced, such that the link is turned on/off after the announced target time. In some embodiments, within the beacon of the turning off announcement, an indication may be carried about whether the announced link can be used after the announcement of link turn on/off. In some embodiments, the STA MLD may change the on/off state of at least one link via an Action frame (e.g., Operation Mode Notification).

In one embodiment, if an AP MLD transmits beacons on one link (e.g., link1) of the AP MLD and another link (e.g., link2) of the AP MLD, rules further described herein may be applied. For example, when an AP MLD transmits beacons on link1 and link2 of the AP MLD, information for frame exchange of link1 may not be announced in the beacons on link2. Examples of the information for frame exchange of link1 may include capabilities, operating parameters (e.g., EDCA, Multi-User EDCA, Orthogonal Frequency Division Multiple Access (OFDMA) access parameters, Spatial Reuse parameters, etc.) and BSS operating parameters. Additionally, in the beacons on link2, information for receiving beacons of link1 (e.g., Primary Channel, BW, and Target Beacon Transmission Time (TBTT) of link2) may be announced. In such an announcement, a new element or updating the current element (e.g., Reduced Neighbor Report (RNR)) may be defined. In another embodiment, the AP MLD transmits beacons on all links of the AP MLD. In such an embodiment, the beacons on a link (e.g., link1) include information for frame exchange on another link (e.g., link2) where beacons are transmitted. Additionally, the information used for receiving beacons on link2 where beacons are transmitted (e.g., Primary Channel, BW, and TBTT of link2) may be announced in the beacons on link1. In such an announcement, a new element or updating the current element (e.g., RNR) may be defined.

In some embodiments, a technique for multi-link operations may also include a Traffic Identifier (TID) transfer between links, such that the beacon changes a mapping of TIDs through at least one of a negotiation and indication to link where TID frames can be transmitted via a mapped link. An AP MLD or a STA MLD may transfer the AP MLD or the STA MLD working link using at least one of the three techniques described herein. In a first TID transfer technique, the AP MLD or the STA MLD may transfer the AP MLD or the STA MLD working link for related TIDs from a first link (e.g., link1) to a second link (e.g., link2) for some or whole TIDs in link1 through a master link. In a second TID transfer technique, the AP MLD or the STA MLD may transfer the AP MLD or the STA MLD working link for related TIDs from link1 to link2 for some or whole TIDs in link1 through link1. The second TID transfer technique may also vary such that the working link transfer may be done through any active link. In a third TID transfer technique, the AP MLD or the STA MLD may transfer the AP MLD or the STA MLD working link for related TIDs from link1 to link2 if the master link at the STA MLD is active, otherwise, the AP MLD or the STA MLD transfers the AP MLD or the STA MLD working link from link1 to link2 for some or whole TIDs in link1 through link1 or any active link. In some embodiments, TID transfer between links may further be determined through a notification (e.g., TID Transfer Announcement+Acknowledgement (Ack)) or a negotiation (e.g., TID Transfer Request+Ack or TID Transfer response+Ack) technique. In one embodiment, the TID transfer through notification technique includes a message of TID transfer announcement in which the target time of transfer may be announced, such that the target link may be used after the announced target time. In another embodiment, the TID transfer through notification technique includes an indication about whether the original link may be used after the announcement of TID transfer. In one embodiment, the TID transfer through negotiation technique includes a message of TID transfer announcement in which a maximal time of transfer may be announced, such that the target link may be used after a maximal time of transmitting a TID transfer response where the request is accepted. In another embodiment, the TID transfer technique includes a message of TID transfer announcement in which an indication may be carried about whether the original link may be used after transmitting the TID transfer response where the request is accepted.

In some embodiments, frame exchange between an AP MLD and a STA MLD includes the transmission of group-addressed frames. In one embodiment, group-addressed frames for the STA MLDs are transmitted on a master link of the STA MLDs. In another embodiment, group-addressed frames for single link STAs are transmitted on a link where the single link STAs do association. In another embodiment, group-addressed frames for legacy STAs are transmitted on the link where the legacy STAs do association. In addition, group-addressed frames may involve a technique for a buffered group-addressed indication, such that the buffered group-addressed frame indication may only be applied to a link (e.g., link1 or link2) that a beacon is transmitted on.

Figure 5:
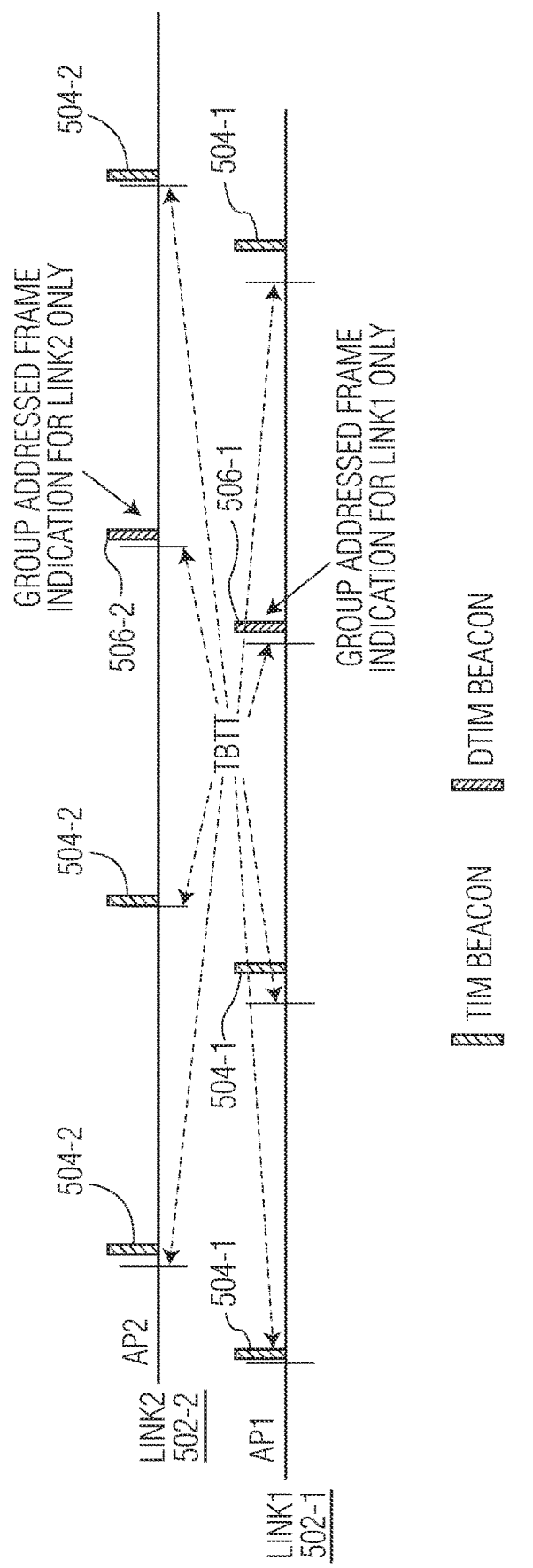
FIG. 5 illustrates another example of a technique for operating links used in the multi-link communications system depicted in FIG. 1.

FIG. 5 illustrates another example of a technique for operating links in the multi-link communications system depicted in FIG. 1. With reference to FIG. 5, an AP MLD (not shown) that includes two APs, implemented as AP1 (shown on the left side of FIG. 5 next to link1 502-1) and AP2 (shown on the left side of FIG. 5 next to link2 502-2) that are associated with two links, link1 502-1 and link2 502-2. In such an example, AP1 and AP2 of the AP MLD transmit beacons on link1 502-1 and link2 502-2 at respective TBTTs (shown in FIG. 5 via an arrow pointing to vertical bars on link1 502-1 and link2 502-2). Although AP1 of the AP MLD transmits TIM beacons 504-1 on link1 502-1, AP1 of the AP MLD also transmits a Delivery TIM (DTIM) beacon 506-1 on link1 502-1, such that the DTIM beacon 506-1 on link1 502-1 is a group-addressed frame indication for link1 502-1 only. In addition, although AP2 of the AP MLD transmits Traffic Identification Map (TIM) beacons 504-2 on link2 502-2, AP2 of the AP MLD also transmits a DTIM beacon 506-2 on link2 502-2, such that the DTIM beacon 506-2 on link2 502-2 is a group-addressed frame indication for link2 502-2 only. Although the technique illustrated in FIG. 5 is shown as including three TIM beacons 504-1 on link1 502-1 and 504-2 on link2 502-2, other embodiments may include less than three TIM beacons or more than three TIM beacons.

In some embodiments, frames transmitted on a reporting link include an element or elements of the reported link. For example, an element may carry information relating to a link or MLD and may be transmitted as part of the transmitted frame (e.g., a beacon, management frame, Probe Request/Response, etc.) transmitted in another link. In some embodiments, an element can be applied to a reported link only if the element has a link identifier (ID) to indicate a reported link. In one embodiment, the Per STA Profile is the element for the reported link. The Per STA Profile element format may include an Element ID (1 octet), Length (1 octet), Element ID Extension (0 or 1 octet), a Link ID, and Subelements (variable number of subelements, in which each subelement can have a variable number of octets), where the Link ID indicates the reported link. By default, if there is no subelement in the Per STA Profile element whose Subelement ID (and Subelement ID Extension if exists) is the same as the Element ID (and Element ID extension if exists) of an element in a beacon, Probe Request/Response, or (re)association request/response, the element may be applied to the reporting link and the reported link (i.e., information of the reporting link being carried in the element is inherited by the reported link).

In some embodiments, multiple Per STA Profile elements are needed to carry the subelements if one Per STA Profile element cannot carry all the subelements. In one embodiment, when multiple Per STA Profile elements are needed to carry the subelements, one subelement may not be allowed to be in more than one Per STA Profile element (i.e., the subelement cannot be fragmented) and if the subelement can be fit in current Per STA Profile element (i.e., after aggregating the subelement, the Per STA Profile element is not more than the maximal allowed length of an element), the subelement will not be put in a new Per STA Profile element.

In some embodiments, a reported link may want to inherit an element from a reporting link. In such an embodiment, the inheriting technique of the IEEE 802.11ax communication protocol may be applied to information of the Per STA Profile of the reported link. Furthermore, an indication may be used to announce whether or not the IEEE 802.11ax communication protocol inheriting technique will be used. When the inheriting technique of the IEEE 802.11ax communication protocol is used in a management frame, (i) an element is inherited from a related element of the reporting link in the management frame when an element in the management frame is not included in the Per STA Profile of a reporting link and (ii) an Uninherited Element subelement is used to avoid such inheritance in some cases (e.g., the element ID or element ID+element ID extension is not carried in an Uninherited Element subelement).

In some embodiments, a reported link may not want to inherit an element from a reporting link even if a related element is not defined in the Per STA Profile element. For example, when the reported link does not want to inherit an element from the reporting link, the Per STA Profile element may include an Uninherited Element subelement. In such an example, if an Element ID and Element ID extension (if exists) are included in the Uninherited Element subelement of the reported link, the element identified by the Element ID and Element ID Extension (if exists) is not inherited by the reported link.

Figure 6A:
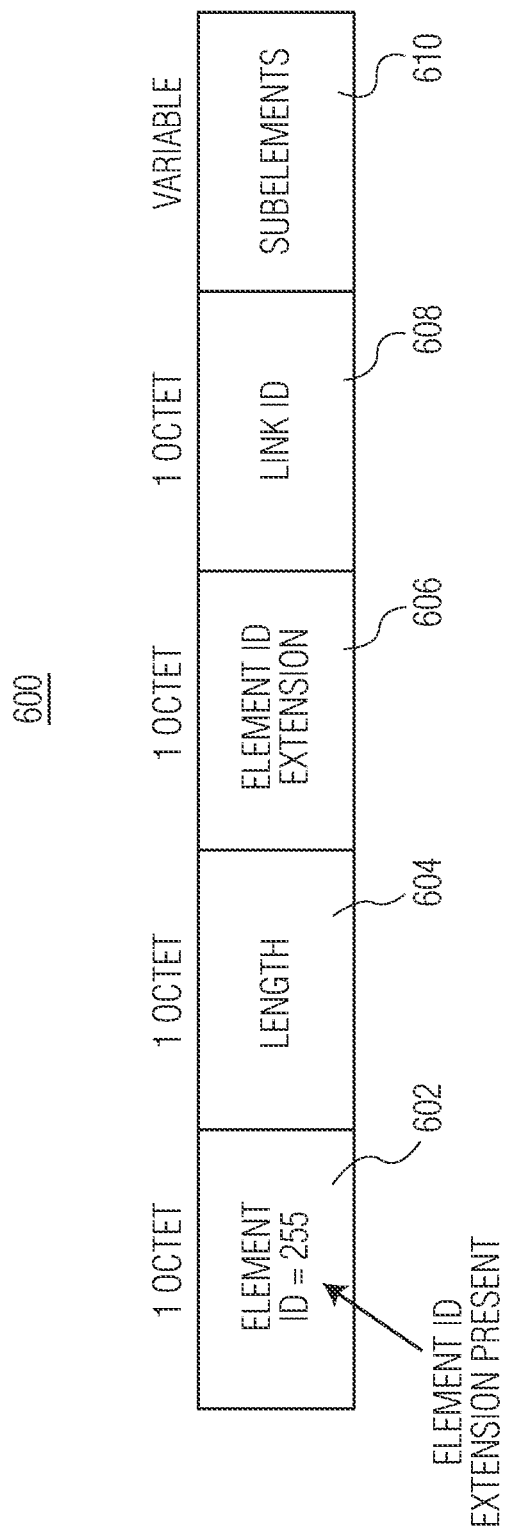
FIG. 6A depicts an example of a format for a Per STA Profile element used in the multi-link communications system depicted in FIG. 1.

FIG. 6A depicts an example of a format for a Per STA Profile element that can be used in the multi-link communications system depicted in FIG. 1. With reference to FIG. 6A, a format of a Per STA Profile element features an Element ID, Length, Element ID Extension, Link ID, and Subelements. In such an example, the Per STA Profile element 600 is depicted as including an Element ID (1 octet) 602 with an Element ID Extension present (e.g., ID=255), a Length (1 octet) 606, an Element ID Extension (1 octet) 606, a Link ID (1 octet) 608, and Subelements 610 (variable number of subelements and variable number of octets).

Figure 6B:
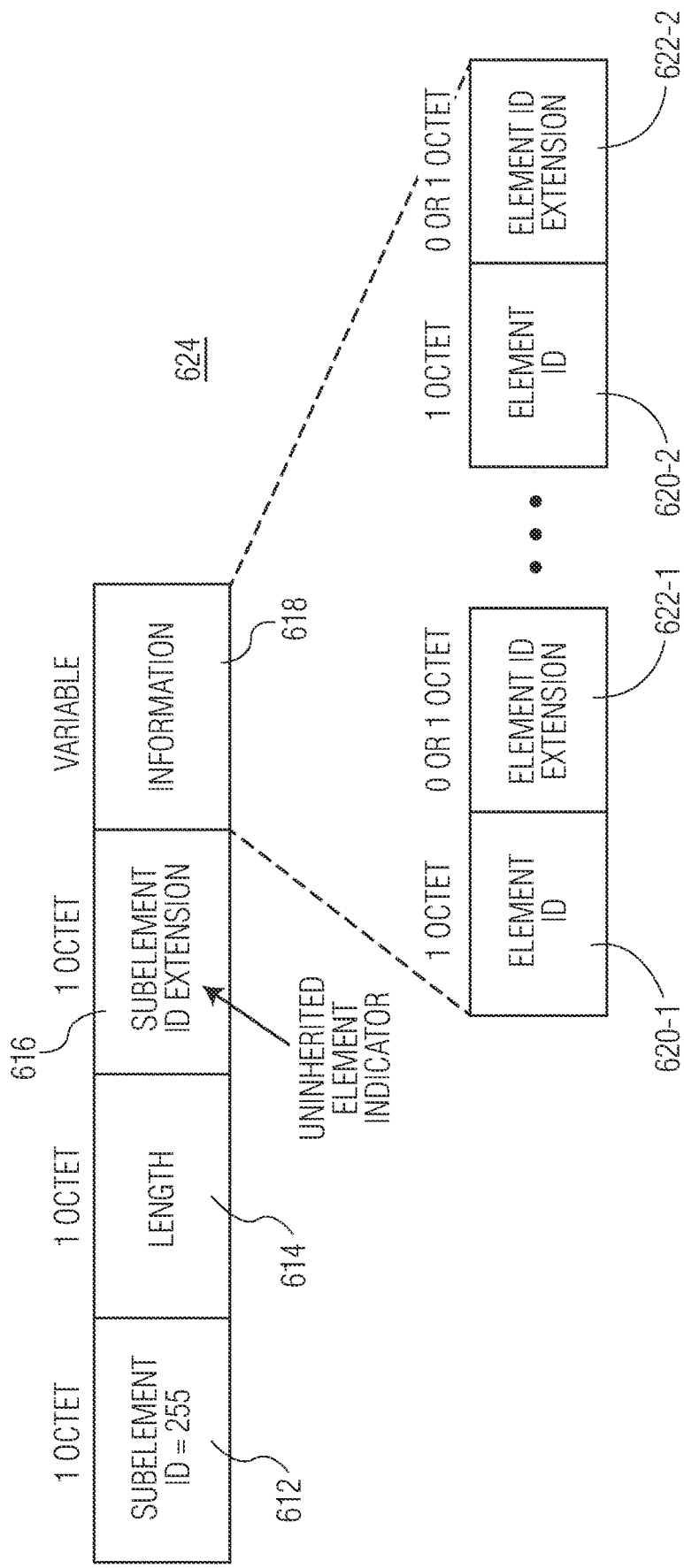
FIG. 6B depicts an example of a format for an Uninherited Element subelement that can be used in the multi-link communications system depicted in FIG. 1.

FIG. 6B depicts an example of a format for an Uninherited Element subelement that can be used in the multi-link communications system depicted in FIG. 1. With reference to FIG. 6B, a format of an Uninherited Element subelement of a Per STA Profile element is shown as including a Subelement ID, Length, Subelement ID Extension (Uninherited element indicator), and Information such that the Information may be an extensible element where new fields can be added. For example, Uninherited Element subelement 624 includes a Subelement ID (1 octet) 612, a Subelement Length (1 octet) 614, a Subelement ID Extension (1 octet) 616 with an Uninherited Element indicator, and a Subelement Information (variable number of octets) 618. The Information 618 is an extensible element, such that Information 618 may include a first Element ID 620-1 (1 octet) and a first Information Element ID Extension (0 or 1 octet) 622-1, as well as a second Information Element ID (1 octet) 620-1 and a second Information Element ID Extension (0 or 1 octet) 622-2.

In some embodiments, multiple links of AP MLDs in an AP device may support a multiple BSSID feature. In some embodiments, if an AP in a link (e.g., link1) that is affiliated with an AP MLD has a transmitted BSSID, the AP in another link (e.g., link2) that is affiliated with the same AP MLD can be a non-transmitted BSSID. In such an embodiment, the Multiple BSSID elements in different links define either the same number of non-transmitted BSSIDs or a different number of non-transmitted BSSIDs. Transmitted BSSID APs and non-transmitted BSSID APs as well as the elements in the beacons of the transmitted BSSID APs and non-transmitted BSSID APs are described in further detail with reference to FIGS. 7A-7C.

Figure 7A:
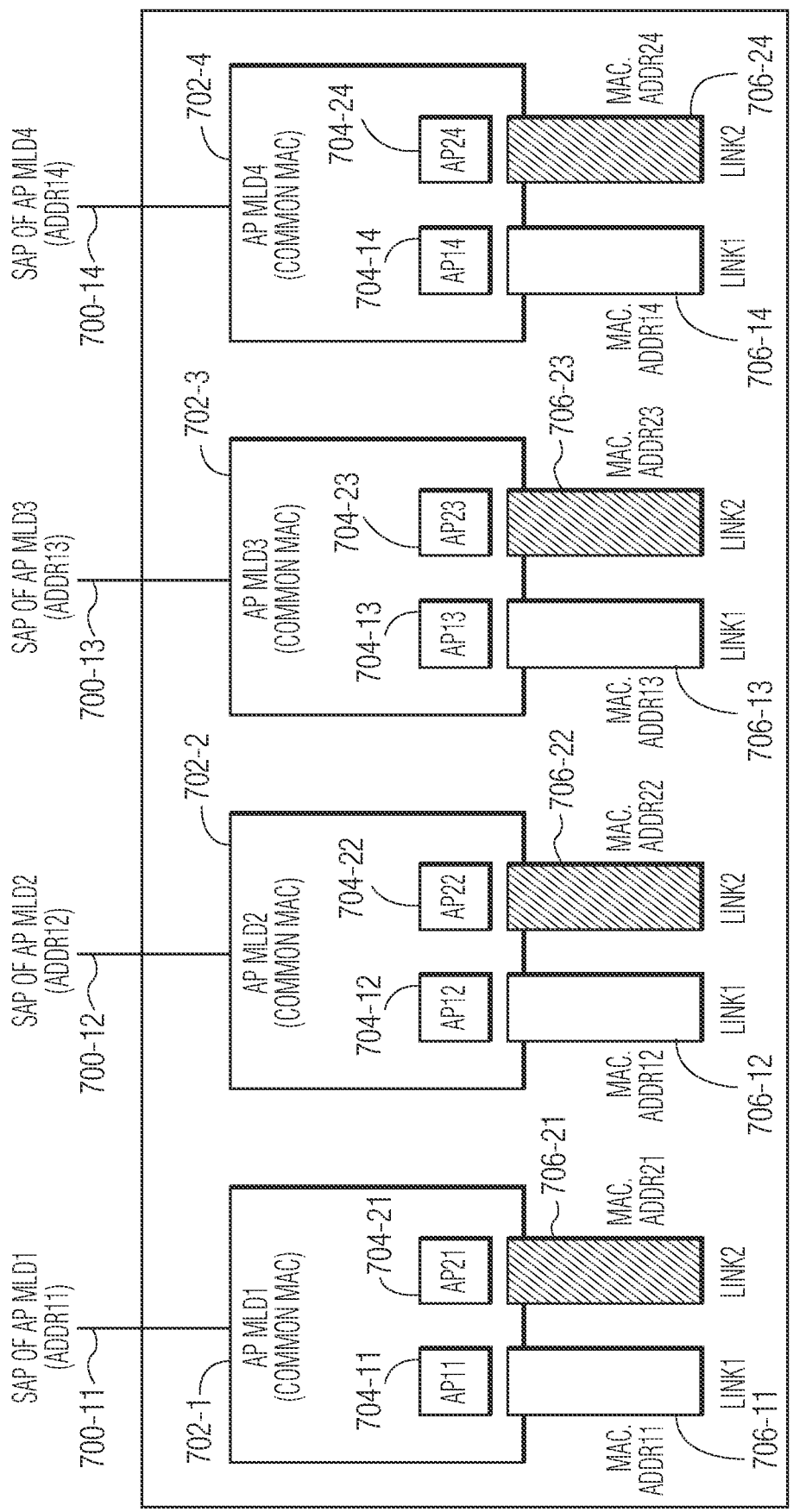
FIG. 7A depicts another example of a multi-link communication system in accordance with an embodiment of the invention.

FIG. 7A depicts another example of multi-link communication system in accordance with an embodiment of the invention. The example depicted in FIG. 7A shows Multi-BSSID APs being used for an association with STA MLDs (not shown) with a different number of links. In the example depicted in FIG. 7A, the AP MLDs all have a common MAC and are each associated with a designated SAP of an AP MLD. The AP MLDs in FIG. 7A further include two APs that each have a respective affiliated link with a designated AP MAC address. For example, a first AP MLD, implemented as AP MLD1 (common MAC) 702-1 is shown as being associated with a first SAP of an AP MLD, implemented as SAP of AP MLD1 (addr11) 700-11. In such an example, AP MLD1 702-1 includes two APs, implemented as AP11 (MAC Addr11) 704-11 affiliated with link1 706-11 and AP21 (MAC Addr21) 704-21 affiliated with link2 706-21. Such an example also includes a second AP MLD, implemented as AP MLD2 (common MAC) 702-2 that is shown as being associated with a second SAP of an AP MLD, implemented as SAP of AP MLD2 (addr12) 700-12. In such an example, AP MLD2 702-2 includes two APs, implemented as AP12 (MAC Addr12) 704-12 affiliated with link1 706-12 and AP22 (MAC Addr22) 704-22 affiliated with link2 706-22. Such an example also includes a third AP MLD, implemented as AP MLD3 (common MAC) 702-3 that is shown as being associated with a third SAP of an AP MLD, implemented as SAP of AP MLD3 (addr13) 700-13. In such an example, AP MLD3 702-3 includes two APs, implemented as AP13 (MAC Addr13) 704-13 affiliated with link1 706-13 and AP23 (MAC Addr23) 704-23 affiliated with link2 706-23. Such an example also includes a fourth AP MLD, implemented as AP MLD4 (common MAC) 702-4 that is shown as being associated with a fourth SAP of an AP MLD, implemented as SAP of AP MLD4 (addr14) 700-14. In such an example, AP MLD4 702-4 includes two APs, implemented as AP14 (MAC Addr14) 702-14 affiliated with link1 706-14 and AP24 (MAC Addr24) 704-24 affiliated with link2 706-24. In such an embodiment, link1 706-11 affiliated with AP11 (MAC Addr11) 704-11 of AP MLD1 702-1, link1 706-12 affiliated with AP12 (MAC Addr12) 704-12 of AP MLD2 702-2, link1 706-13 affiliated with AP13 (MAC Addr13) 704-13 of AP MLD3 702-3, and link1 706-14 affiliated with AP14 (MAC Addr14) 704-14 of AP MLD4 702-4 are Multi-BSSID APs in the same channel and share beacon transmission. In addition, link2 706-21 affiliated with AP21 (MAC Addr21) 704-21 of AP MLD1 702-1, link2 706-22 affiliated with AP22 (MAC Addr22) 704-22 of AP MLD2 702-2, link2 706-23 affiliated with AP23 (MAC Addr23) 704-23 of AP MLD3 702-3, and link2 706-24 affiliated with AP24 (MAC Addr24) 704-24 of AP MLD4 702-4 are Multi-BSSID APs in the same channel and share beacon transmission.

Figure 7B:
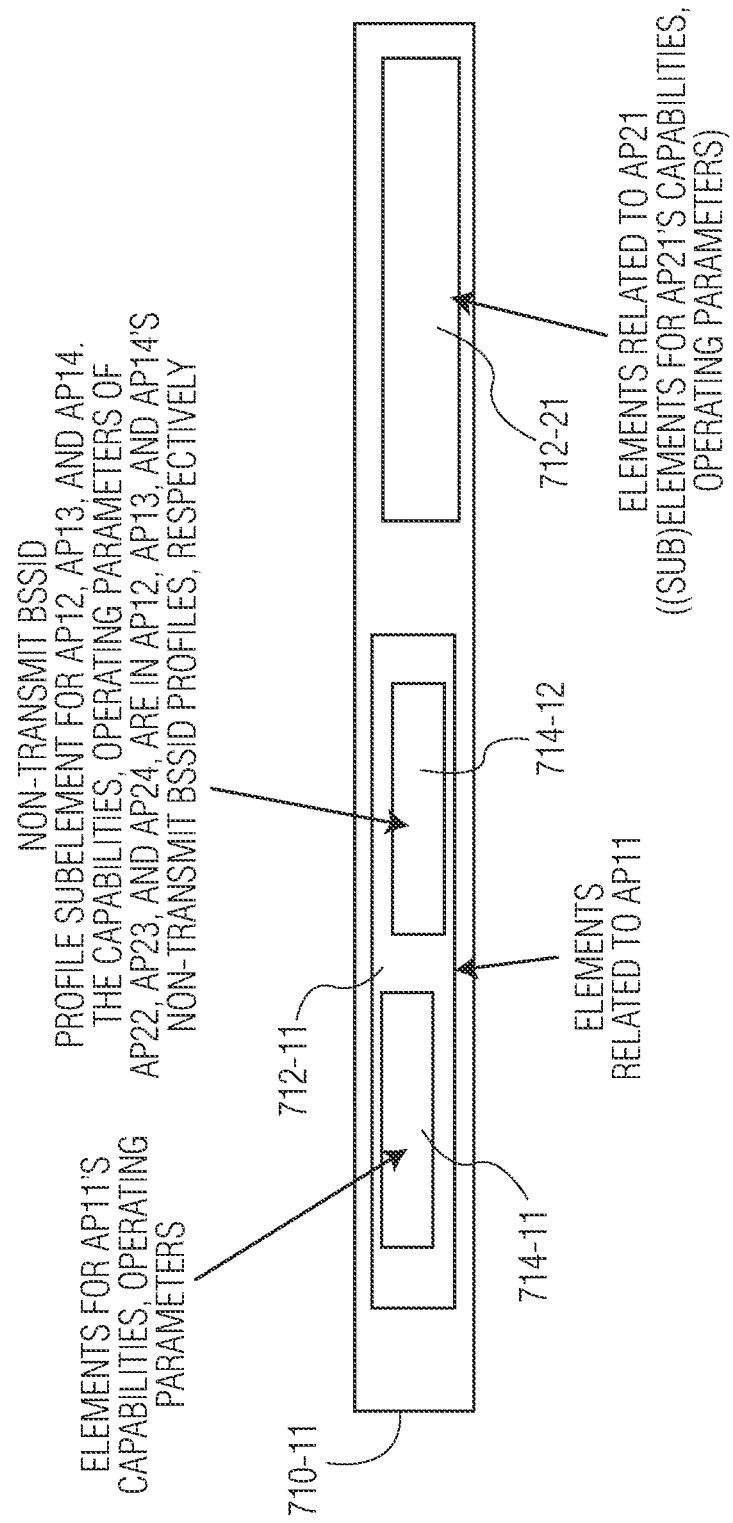
FIG. 7B depicts another example of a frame format used in the multi-link communications system depicted in FIG. 1.

FIG. 7B depicts another example of a frame format that can be used in the multi-link communications system depicted in FIG. 1. In FIG. 7B, elements of a management frame (e.g., beacon) transmitted by an AP of an AP MLDs shown in FIG. 7A are depicted. With reference to FIG. 7B, a beacon, implemented as AP11's beacon 710-11 is shown. The beacon as shown in FIG. 7B includes information such as capability, operating parameters, and BSSID announcements. AP11's beacon 710-11 is an example of a beacon transmitted by AP11 704-11 with transmitted BSSID of AP MLD1 702-1 in FIG. 7A. In such an example, AP11's beacon 710-1 includes a first group of elements 712-11 with a first subgroup of elements 714-11 and a second subgroup of element(s) 714-12 as well as a second group of elements 712-21. The first group of elements 712-11 of AP11's beacon 710-11 includes elements related to AP11 (shown in FIG. 7A), such that the first group of elements 712-11 includes the first subgroup of elements 714-11 that relates to AP11 and the second subgroup of element(s) 714-12. The first subgroup of elements 714-11 of the first group of elements 712-11 includes elements for AP11's capabilities and operating parameters. The second subgroup of element (s) 714-12 may include one or more Multiple BSSID elements that relates to AP12 (e.g., AP12's related capabilities, operating parameters in a non-transmitted BSSID Profile element for AP12) and APs in other links affiliated with the same AP MLD as AP12 (e.g., AP22's related capabilities, operating parameters in a Per STA Profile element for AP22 being in AP12's non-transmitted BSSID Profile element), AP13 (e.g., AP13's related capabilities, operating parameters in a non-transmitted BSSID Profile element for AP13) and APs in other links affiliated with the same AP MLD as AP13 (e.g., AP23's related capabilities, operating parameters in a Per STA Profile element for AP23 being in AP13's non-transmitted BSSID Profile element), and AP14 (e.g., AP14's related capabilities, operating parameters in a non-transmitted BSSID Profile element for AP14) and APs in other links affiliated with the same AP MLD as AP14 (e.g., AP24's related capabilities, operating parameters in a Per STA Profile element for AP22 being in AP12's non-transmitted BSSID Profile element) (APs shown in FIG. 7A). The second group of elements 712-21 of AP11's beacon 710-11 includes elements related to AP21 that are affiliated with the same AP MLD as AP11 (e.g., AP MLD1), such that the second group of elements 712-21 may be elements related to AP21 and (sub)elements for AP21's capabilities and operating parameters that are in Per STA Profile(s) for AP21.

Although the beacon 710-11 in FIG. 7B is shown as an example for an AP MLD with two links with three non-transmitted BSSIDs, other embodiments may include AP MLDs with more than two links or less than two links. In addition, although the element in FIG. 7B is shown as including two links that support multiple BSSID, other embodiments may include one link that supports multiple BSSID and other links that may not support multiple BSSID.

Figure 7C:
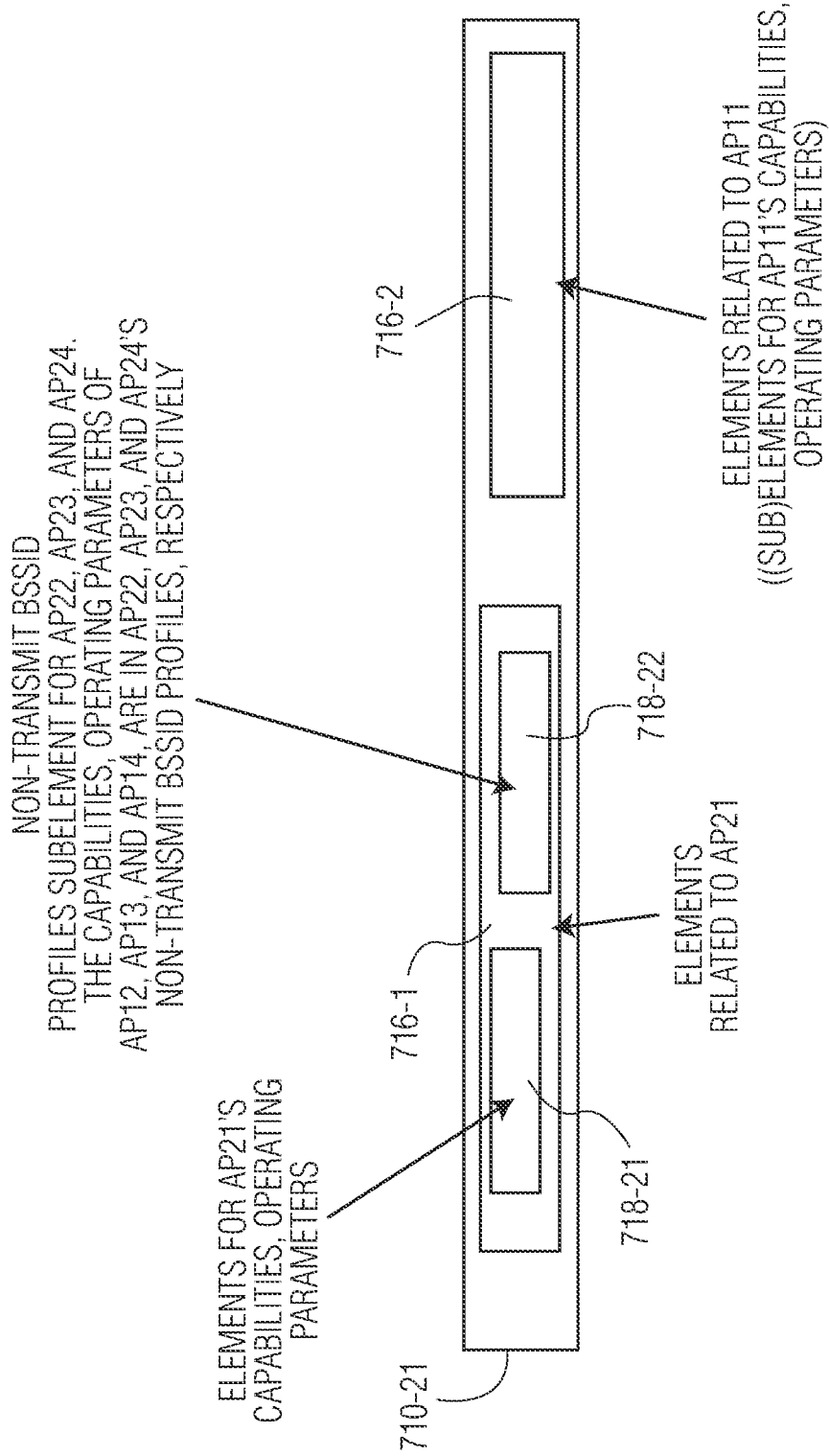
FIG. 7C depicts another example of a frame format used in the multi-link communications system depicted in FIG. 1.

FIG. 7C depicts another example of a frame format used in the multi-link communications system depicted in FIG. 1. In FIG. 7C, elements of a management frame (e.g., beacon) transmitted by an AP of an AP MLDs shown in FIG. 7A are depicted. With reference to FIG. 7C, a beacon, implemented as AP21's beacon 710-21 is shown. The beacon as shown in FIG. 7C includes information such as capability, operating parameters, and BSSID announcements. AP21's beacon 710-21 is an example of a beacon transmitted by AP21 704-21 with transmitted BSSID of AP MLD1 702-1 in FIG. 7A. In such an example, AP21's beacon 710-21 includes a first group of elements 716-1 with a first subgroup of elements 718-21 and a second subgroup of element(s) 718-22 as well as a second group of elements 716-2. The first group of elements 716-1 of AP21's beacon 710-21 includes elements related to AP21, such that the first group of elements 716-1 includes the first subgroup of elements 718-21 that relates to AP21 and the second subgroup of element(s) 718-22 that relates to AP22, AP23, and AP24. The first subgroup of elements 718-21 of the first group of elements 716-1 includes elements for AP21's capabilities and operating parameters. The second subgroup of element (s) 718-22 may include one or more Multiple BSSID elements that relates to AP22 (e.g., AP22's related capabilities, operating parameters in a non-transmitted BSSID Profile element for AP22) and APs in other links affiliated with the same AP MLD as AP22 (e.g., AP12's related capabilities, operating parameters in a Per STA Profile element for AP12 being in AP22's non-transmitted BSSID Profile element), AP23 (e.g., AP23's related capabilities, operating parameters in a non-transmitted BSSID Profile element for AP23) and APs in other links affiliated with the same AP MLD as AP23 (e.g., AP13's related capabilities, operating parameters in a Per STA Profile element for AP13 being in AP23's non-transmitted BSSID Profile element), and AP24 (e.g., AP24's related capabilities, operating parameters in a non-transmitted BSSID Profile element for AP24) and APs in other links affiliated with the same AP MLD as AP24 (e.g., AP14's related capabilities, operating parameters in a Per STA Profile element for AP12 being in AP22's non-transmitted BSSID Profile element) (APs shown in FIG. 7A). The second group of elements 716-2 of AP21's beacon 710-21 includes elements related to AP11 that are affiliated with the same AP MLD as AP21, such that the second group of elements 716-2 may include elements related to AP11 and (sub)elements for AP11's capabilities and operating parameters that are in a Per STA Profile(s) for AP11.

In some embodiments, when both a first link (e.g., link1) and a second link (e.g., link2) associated with APs of an AP MLD transmit beacons, the beacons transmitted on link1 may not transmit all of link2's information. Examples of link2's information may include an enhanced RNR element that is used to carry the information of link1, or other parameters (e.g., link ID, MAC SAP Address, TSF Time, etc.).

In accordance with another embodiment of the invention, a technique for operating links in a multi-link communications system, which may decrease management frame overhead (e.g., beacon overhead, overhead of Probe Request/Response, overhead of Association Request/Response, etc.) in a multi-link communication system with Multiple BSSID is described herein. In such an embodiment, an inheritance technique similar to the IEEE 802.11ax communication protocol may be used. In some embodiments, a "level one" inheritance may involve a Per STA Profile of an AP (e.g., APy1) in a reported link (e.g., link_y) not including a subelement and information of another AP (e.g., APx1) in a reporting link (e.g., link_x) where a management frame (e.g., beacon) is transmitted, in which the management frame includes a related element, APy1 in the reported link may inherit the related element from APx1 in the reporting link. Such an embodiment may occur even if APy1 has non-transmitted BSSID. For example, in a level one inherit, when APy2 is a transmitted BSSID in link_y, the operating parameters of APy1 in a beacon of link_x may not include an EDCA parameter set, and when APx1 in link_x and APy1 are affiliated with the same AP MLD, then the operating parameters of APy2 in the beacon of link_x may include EDCA parameter set 1, the operating parameters of APx1 of link_x may include EDCA parameter set 2, and the STAs in link_y that are associated with APy1 may have EDCA parameter set 2. In some embodiments, a "level two" inheritance may occur when, (i) a Per STA profile of an AP (e.g., APy1) in a reported link (e.g., link_y) does not include a subelement and, (ii) information of another AP (e.g., APx1 with nontransmitted BSSID) in a reporting link (e.g., link_x) where a management frame (e.g., beacon) is transmitted, in which the management frame includes a related element, APy1 in the reported link may inherit the related element from APx2 in the reporting link. Such an embodiment may occur even if APy1 has non-transmitted BSSID. For example, APx2 may have a transmitted BSSID in link_x. As another example, in a level two inherit, APy1 may inherit EDCA parameters from APx2 when, (i) the operating parameters of APy1 in a beacon of link_x transmitted by APx2 do not include an EDCA parameter set, (ii) APx1 in link_x and APy1 are affiliated with the same AP MLD, (iii) the operating parameters of APx1 of link_x does not include an EDCA parameter set, and (iv) the operating parameters of APx2 include an EDCA parameter set. Such an inheritance may occur even if the information of APy2 in the beacon includes an EDCA parameter. Thus, because APy1 inherits the EDCA parameter set from APx2, the STAs in link_y that are associated with APy1 may use the EDCA parameter set announced for APx2 (inherited by APy1). In some embodiments, when APx1 and APy1 are affiliated with one AP MLD, APy1, which is a non-transmitted BSSID, may disallow the level one inherit and the level two inherit of the capabilities or operating parameter from certain APs in beacon of link_x. In one embodiment, APy1 in the reported link may disallow the level one inherit and the level two inherit of the capabilities or operating parameter by including an Uninherited Element subelement in the Per STA Profile of APy1. In some embodiments, the level one inherit and the level two inherit can be separately disallowed. In one embodiment, an indication about whether an inheritance of level one and an inheritance of level two is allowed is carried in a Per STA Profile. In one embodiment, the level one inherit has a higher priority than the level two inherit. As an example, APy1 in a reported link (e.g., link_y) may use the level one inherit to inherit an element (with element ID of EID) from APx1 when, (i) information of APy1 in a management frame in a reporting link (e.g., link_x) does not include the element (with element ID of EID), (ii) information of APx1 with non-transmitted BSSID in the reporting link includes the element (with element ID of EID), and (iii) APx2 has the transmitted BSSID that transmits the management frame that includes the element (with element ID of EID) for APx2.

A technique for announcing information in accordance with an embodiment of the invention is described with reference to a flow diagram in FIG. 8. At block 802, a MLD that supports a first link, link1, and a second link, link2, announces at least one of a capability, Basic Service Set (BSS) operating parameter, and operating mode of an AP affiliated with an AP MLD in a reported link, and at least one of a capability, Basic Service Set (BSS) operating parameter, and operating mode of an AP affiliated with an AP MLD in a reporting link via a management frame on the reporting link.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method of multi-link operations, the method comprising:
   at a multi-link device (MLD) that supports a first link, link1, and a second link, link2,
   announcing in a management frame transmitted on a reporting link at least one of a capability, Basic Service Set (BSS) operating parameter, and operating mode of a first AP affiliated with an AP MLD from the reported link, and at least one of a capability, Basic Service Set (BSS) operating parameter, and operating mode of a second AP affiliated with the AP MLD from the reporting link;
   wherein the method further comprises an inheritance mechanism;
   wherein the element with the element ID value and the optional element ID extension value of the AP in the reported link affiliated with the AP MLD in the reported link that is not present in the Per STA Profile for the AP in the reported link that is inherited from the element with the same element ID value and the optional same element ID extension value of the AP affiliated with another AP MLD in the reporting link that transmits the beacon if the AP affiliated with the same AP MLD in the reporting link does not have transmitted BSSID; and
   wherein the Per STA Profile for the AP affiliated with the AP MLD in the reported link is in the non-transmitted BSSID Profile of the AP affiliated with the same AP MLD in the reporting link that does not have transmitted BSSID.

2. The method of claim 1,
   wherein at least one of link1 and link2 is the reporting link.

3. The method of claim 1,
   wherein the method further comprises an inheritance mechanism that includes an element with an element ID value and an optional element ID extension value of the AP in the reported link affiliated with an AP MLD that is not present in a Per STA Profile for the AP in the reported link that is inherited from an element with the same element ID value and an optional same element ID extension value of the AP in the reporting link affiliated with the same AP MLD.

4. The method of claim 1,
   wherein the method further comprises an indication in the management frame about whether the AP on the reported link affiliated with the AP MILD uses the inheritance mechanism to inherit information from the AP affiliated with the same AP MILD, or the AP that transmits the management frame.

5. The method of claim 1,
   wherein simplified information of the AP in the reported link affiliated with the AP MLD is carried via a Reduced Neighbor Report (RNR) in the management frame sent on the reporting link that is different from the reported link.

6. The method of claim 1,
   wherein the AP MLD and other AP MLDs belong to a same AP device.

7. The method of claim 6,
   wherein the APs of one link affiliated with AP MLDs are defined by a multiple BSSID feature and the APs of another link affiliated with the same group of AP MLDs are not defined by the multiple BSSID feature.

8. The method of claim 6,
   wherein the APs of one link affiliated with AP MLDs are defined by the multiple BSSID feature and the APs of another link affiliated with the same group of AP MLDs are defined by the multiple BSSID feature; and
   wherein, the AP of one AP MLD in one link has transmitted BSSID, and the AP of the same AP MLD in another link does not have transmitted BSSID.

9. A multi-link device (MLD), comprising:
   a processor configured to announce in a management frame transmitted on a reporting link at least one of a capability, Basic Service Set (BSS) operating parameter, and operating mode of a first AP affiliated with an AP MLD from a reported link, and at least one of a capability, Basic Service Set (BSS) operating parameter, and operating mode of a second AP affiliated with the AP MLD from the reporting link;
   wherein the MLD further comprises an inheritance mechanism;
   wherein the element with the element ID value and the optional element ID extension value of the AP in the reported link affiliated with the AP MLD in the reported link that is not present in the Per STA Profile for the AP in the reported link that is inherited from the element with the same element ID value and the optional same element ID extension value of the AP affiliated with another AP MLD in the reporting link that transmits the beacon if the AP affiliated with the same AP MLD in the reporting link does not have transmitted BSSID; and
   wherein the Per STA Profile for the AP affiliated with the AP MLD in the reported link is in the non-transmitted BSSID Profile of the AP affiliated with the same AP MLD in the reporting link that does not have transmitted BSSID.

10. The MLD of claim 9,
    wherein at least one of a link1 and a link2 is the reporting link.

11. The MLD of claim 9,
    wherein the MLD further comprises an inheritance mechanism that includes an element with an element ID value and an optional element ID extension value of the AP in the reported link affiliated with an AP MLD that is not present in a Per STA Profile for the AP in the reported link that is inherited from an element with the same element ID value and an optional same element ID extension value of the AP in the reporting link affiliated with the same AP MLD.

12. The MLD of claim 9,
    wherein the MLD further comprises an indication in the management frame about whether the AP on the reported link affiliated with the AP MLD uses the inheritance mechanism to inherit information from the AP affiliated with the same AP MLD, or the AP that transmits the management frame.

13. The MLD of claim 9,
    wherein simplified information of the AP in the reported link affiliated with the AP MLD is carried via a Reduced Neighbor Report (RNR) in the management frame sent on the reporting link that is different from the reported link.

14. The MLD of claim 9,
    wherein the AP MLD and other AP MLDs belong to a same AP device.

15. The MLD of claim 14,
    wherein the APs of one link affiliated with AP MLDs are defined by a multiple BSSID feature and the APs of another link affiliated with the same group of AP MLDs are not defined by the multiple BSSID feature.

16. The MLD of claim 14,
wherein the APs of one link affiliated with AP MLDs are defined by the multiple BSSID feature and the APs of another link affiliated with the same group of AP MLDs are defined by the multiple BSSID feature; and
wherein, the AP of one AP MLD in one link has transmitted BSSID, and the AP of the same AP MLD in another link does not have transmitted BSSID.

17. A multi-link device (MILD), comprising:
a processor configured to announce at least one of a capability, Basic Service Set (BSS) operating parameter, and operating mode of an AP affiliated with an AP MLD in a reported link, and at least one of a capability, Basic Service Set (BSS) operating parameter, and operating mode of an AP affiliated with an AP MLD in a reporting link via a management frame on the reporting link; and
an inheritance mechanism;
wherein an element with an element ID value and an optional element ID extension value of the AP in the reported link affiliated with the AP MLD in the reported link that is not present in a Per STA Profile for the AP in the reported link that is inherited from the element with the same element ID value and the optional same element ID extension value of the AP affiliated with another AP MLD in the reporting link that transmits a beacon if the AP affiliated with the same AP MLD in the reporting link does not have transmitted BSSID; and
wherein the Per STA Profile for the AP affiliated with the AP MLD in the reported link is in the non-transmitted BSSID Profile of the AP affiliated with the same AP MLD in the reporting link that does not have transmitted BSSID.

* * * * *